UNITED STATES PATENT OFFICE.

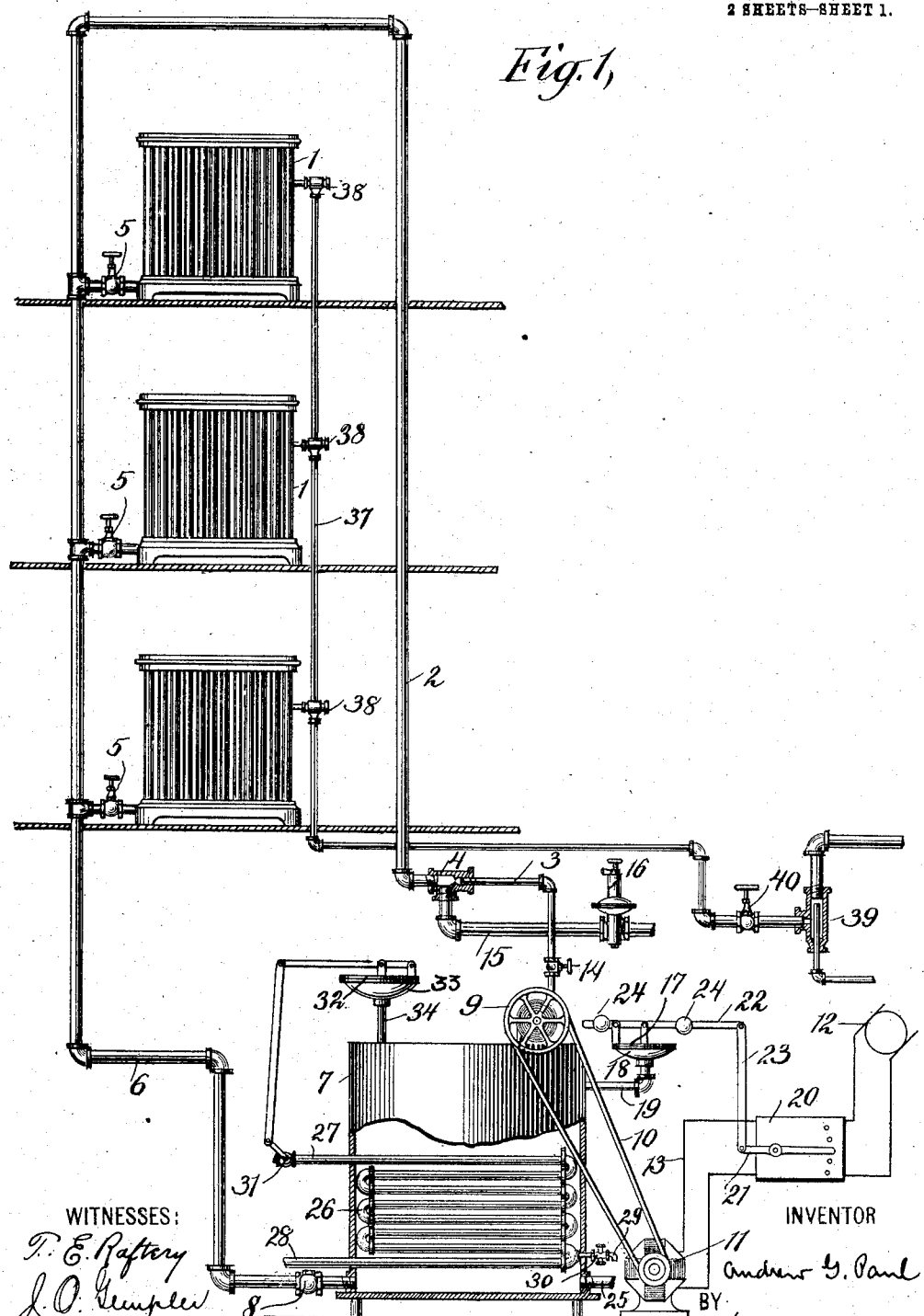

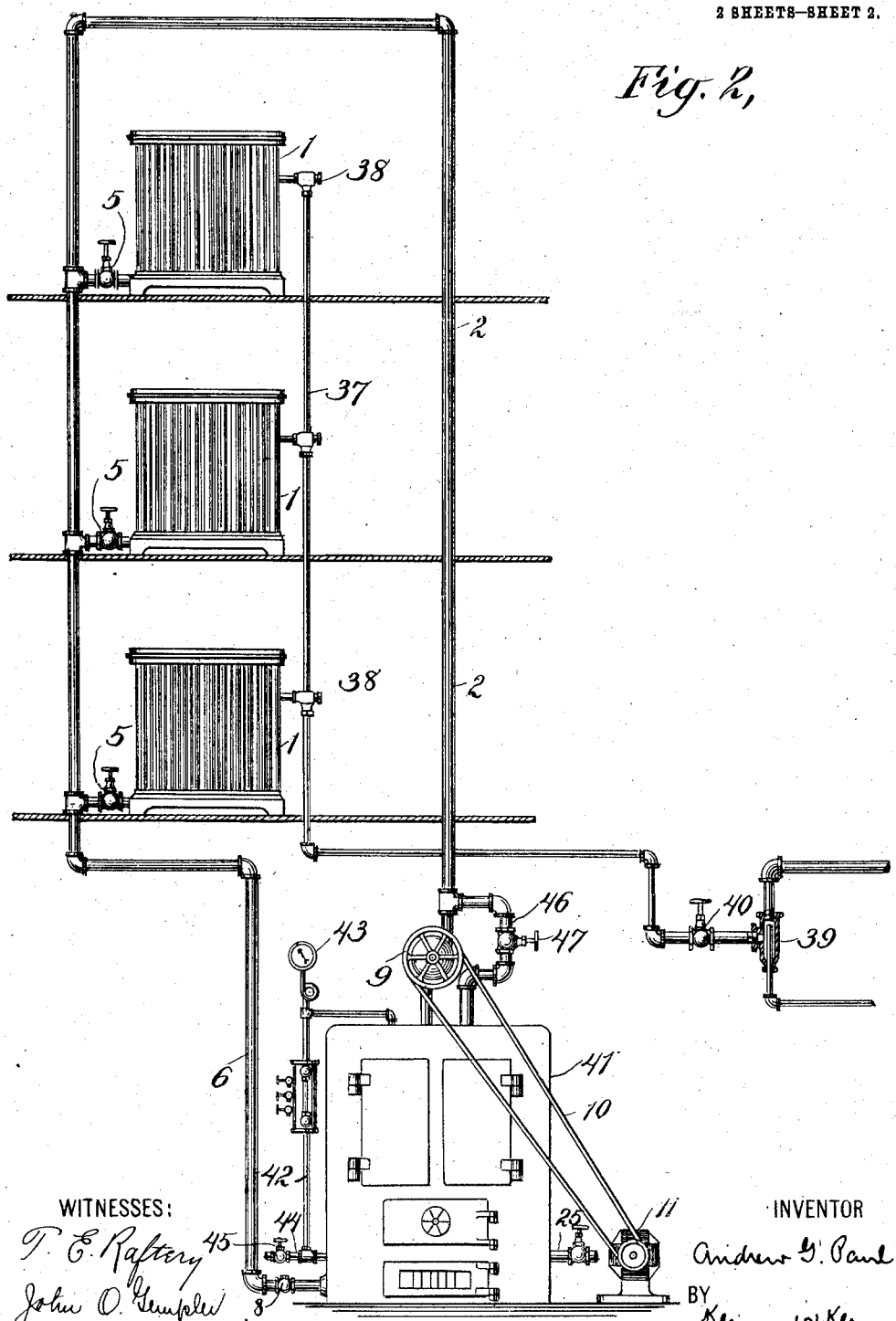

ANDREW G. PAUL, OF BOSTON, MASSACHUSETTS.

STEAM-HEATING SYSTEM.

971,070.  Specification of Letters Patent.  Patented Sept. 27, 1910.

Application filed April 16, 1901. Serial No. 56,058.

*To all whom it may concern:*

Be it known that I, ANDREW G. PAUL, a citizen of the United States, residing in Boston, in the county of Suffolk and State of Massachusetts, have invented a new and useful Improvement in Steam-Heating Systems, of which the following is a full, clear, and exact specification, reference being had to the accompanying drawings, which form a part hereof.

This invention relates to a steam heating system wherein steam is circulated for the purpose of conveying and imparting heat to the places desired, and it consists in an improved construction and arrangement of the parts of such a system.

The object of my invention is to secure the circulation in a steam heating system of the same steam continuously so as to use the said steam, or a portion thereof, over and over again, and at the same time to produce a positive and efficient circulation and to control or regulate the amount of steam which is employed in this manner in the system, so as to accurately and easily control the amount of heating work which is done by the system, and to maintain the efficiency of the heating vehicle in said system.

My invention consists in the combination in a heating system of a heater or radiator, a supply pipe, a return pipe, the said pipes being connected, a re-heating device, a motor in the supply pipe between the re-heating device and the radiator, and means connected with the interior of the system for controlling the motor according to the conditions existing in the system.

My invention also consists in combining with the above a supply main and a reducing valve in the said main.

My invention also consists in certain other features of construction and combinations of parts hereinafter described and claimed.

My invention is fully illustrated in the accompanying drawings, in which—

Figure 1 shows my invention applied to a system having three radiators arranged according to the single pipe overhead feed system; Fig. 2 shows another form or modification of my invention.

Similar numbers denote similar parts in the different figures.

Referring to Fig. 1, 1, 1 are radiators of any suitable form. 2 is the supply pipe. 3 is a portion of the supply pipe leading from the motor to the pipe 2. The pipe 3 which connects with the pipe 2 is provided with any suitable form of jet or induction device 4. This jet is so arranged as to cause an upward current of the steam in the supply pipe 2. 5, 5 are suitable valves on the branches of the supply pipe. 6, 6 is the return pipe through which the water of condensation flows to the tank or reservoir 7. The pipe 6 is provided with any suitable form of valve 8. 9 is a motor of any suitable form. In my complete invention I employ a mechanical motor such as a rotary pump. This motor is placed in the pipe 3 which is connected with the tank 7. The motor 9 may be driven by any suitable source of power. In the form shown in Fig. 1 it is connected by means of a belt 10 with the electric motor 11 which is driven by the dynamo 12 by means of the circuit 13. 14 is an ordinary shut-off valve in the pipe 3. 15 is a supply main coming from any suitable source of supply of steam. This supply main is provided with a controlling device or valve 16. The form of valve shown in Fig. 1 is a reducing valve which can be adjusted so as to control the pressure on the system side. 17 is a fluid pressure motor in the form of a diaphragm. 18 is a fluid pressure chamber underneath said diaphragm, which chamber is connected with tank 7 by means of pipe 19. The diaphragm 17 controls the operation of the motor 11 by means of rheostat device 20. 21 is the lever of the rheostat device which is connected with the diaphragm by means of the lever 22 and the link 23. The lever 22 is provided with adjustable weights 24 by means of which the operation of the diaphragm 17 can be adjusted or regulated. When the pressure in the tank 7 rises above the desired or predetermined point, the diaphragm 17 is raised and thereby operates the lever 21 and cuts out the dynamo 12 or decreases the power supplied from the dynamo to the electric motor 11, thereby stopping the motor 9 or decreasing its speed. When the pressure in the tank 7 falls again the motor 9 is again started or its speed is increased. 25 is a pipe connected with the bottom of the tank 7 provided with any suitable form of valve not shown through which the water of condensation can be drawn off if desired. 26 is a re-heating device which in the particular form shown in Fig. 1 consists of a heating coil which is placed in the tank 7 as shown. 27 is the supply pipe leading to this coil and 28 is the return pipe leading from the same. 29 is an air pipe which is connected with the coil and which is provided with an automatic air valve 30. The air pipe 29 may be connected with any suitable form of exhausting apparatus. 31 is a valve on the supply pipe 27. This valve is controlled by the fluid pressure motor or diaphragm 32. 33 is a fluid pressure chamber on the bottom of said diaphragm which is connected by means of the pipe 34 with the tank 7. When the pressure in the tank 7 rises or increases beyond the desired point, the diaphragm 32 is raised thus closing the valve 31 on the supply pipe of the re-heating coil and shutting off the steam from said coil. 37 is an air pipe provided with suitable automatic air valves 38. 39 is an exhausting device, preferably a steam or water jet, which is connected with the air pipe. The air pipe is provided with a valve 40 by means of which the exhausting device may be shut off.

The operation of this apparatus is as follows. The air is drawn out from the system through the air pipe and exhausting device 39. The steam is admitted through the reducing valve 16 and flows through the system. The water of condensation, together with more or less steam or vapor, flows through the return pipe 6 into the tank 7. The motor 9 being in operation, the steam is caused to flow through the pipe 3 and the supply pipe 2, and thus to circulate again through the system. The motor 9 operating through the jet 4, forces the steam entering through the supply main 15 to pass through the pipe 2 and flow to the radiators. The reheating device 26 reheats the water of condensation flowing into the tank 7 and reevaporates it and the vapor or steam thus produced is drawn from said tank by the motor 9, and also caused by said motor to flow back to and through the system.

Any other suitable reheating device in place of device 26 shown may be used as I do not limit myself to the particular kind of reheating device which I have illustrated.

The air pipe may be connected with any sort of exhausting device or it may be connected with the exhausting device 39. The reducing valve 16 can be so regulated as to maintain a given or desired pressure in the supply main 15. In this way the amount or volume of the steam can be automatically maintained at any desired point.

When from any cause the pressure in the tank 7 rises above the desired or predetermined point, the pressure raises the diaphragm 17 and thereby either breaks the connection between the dynamo 12 and the motor 11 entirely so as to stop the motor 9, or decreases the power supplied to the motor 11 and thereby decreases the speed of the motor 9. When the pressure rises above the predetermined point in the tank 7, it is desirable that the supply of heating medium should be cut off from the reheating device 26. This is accomplished by means of the diaphragm 32, the increase in the pressure in tank 7 operating to raise the said diaphragm and thus close the valve 31 in the supply pipe 27 of the reheating coil. The return pipe 28 from the reheating coil may discharge to any point desired.

Referring to Fig. 2 the parts are as already explained in connection with Fig. 1 with the following differences. Instead of employing a tank with a reheating device in said tank, I employ in this modification of my invention any suitable form of boiler 41, having a furnace of any suitable construction connected therewith for reheating the heating vehicle in said boiler. 42 is a gage connected with the boiler to show the condition of the heating vehicle therein. 43 is a pressure gage. 44 is a supply main through which additional heating vehicle can be supplied to the boiler from any source. This pipe 44 is provided with a valve 45. 46 is a by-pass around the motor 9 and is provided with any suitable form of controlling valve 47. 25 is an outlet pipe from the boiler provided with any suitable form of valve. The motor 11 can be driven by any suitable source of power such, for example, as a dynamo similar to that shown in Fig. 1. The operation of this form of my invention is substantially the same as that already explained. The steam is circulated through the system by the motor 9. The water of condensation escapes from the radiators through the pipe 6 and passes into the boiler 41 where it is reheated and reëvaporated after which it is again circulated through the system. If for any reason it is thought desirable to cut the motor 9 out of the system, this can be accomplished by the controlling valve 47 in the by-pass 46.

It is obvious that my improved heating system may be used for drying purposes.

Some of the advantages of my invention are as follows. The same steam or a part thereof, is continuously circulated through the system and the circulation is made positive irrespective of the pressure in the system. The steam after giving up its heat in the radiators and passing to the return end of the system, is again reheated and again circulated so that by this means a very rapid circulation can be maintained and the steam can be maintained at a high point of efficiency. The system secures great economy The circulation of the steam in the system is not dependent upon the pressure therein.

The operation of the system is automatically controlled by the controlling devices described.

What I claim as new and desire to secure by Letters Patent, is:

1. In a steam heating system the combination of a heater or radiator, a supply pipe, a return pipe, a re-heating device with which both the supply pipe and the return pipe are connected, a motor connected with the supply pipe between the re-heating device and the radiator, and adapted to draw steam from the re-heating device and force it through the supply pipe, and thus maintain any desired pressure in the supply pipe irrespective of the pressure in the reheater, the system being closed or sealed between the motor and the point of discharge from the radiator.

2. In a steam heating system the combination of a heater or radiator, a supply pipe, a return pipe, a re-heating device with which both the supply pipe and the return pipe are connected, a motor connected with the supply pipe between the re-heating device and the radiator, and adapted to draw steam from the re-heating device and force it through the supply pipe, and thus maintain any desired pressure in the supply pipe irrespective of the pressure in the reheater, and a supply main for supplying steam to the supply pipe from an outside source.

3. In a steam heating system, the combination of a heater or radiator, a supply pipe, a return pipe, the said pipes communicating with each other, a re-heating device connected with the said pipes, a motor connected with the supply pipe between the re-heating device and the radiator adapted to draw the steam from the re-heating device and force it through the supply pipe, and thus maintain any desired pressure therein, a supply main from an outside source, and a controlling device in said main adapted to supply additional steam when pressure falls below the predetermined point in the supply pipe.

4. In a steam heating system, the combination of a heater or radiator, a supply pipe, a return pipe, the said pipes communicating with each other, a re-heating device, a motor connected with the supply pipe between the re-heating device and the radiator, adapted to draw the steam from the re-heating device and force it through the supply pipe and thus maintain the pressure therein, a supply main from an outside source, and a reducing valve in said main adapted to supply additional steam when the pressure falls below the predetermined point.

In testimony whereof, I have signed my name to this specification, in the presence of two subscribing witnesses.

ANDREW G. PAUL.

Witnesses:
   EDWIN SEGER,
   JOHN O. GEMPLER.